United States Patent
Shen et al.

(10) Patent No.: US 7,720,990 B2
(45) Date of Patent: May 18, 2010

(54) METHOD AND APPARATUS FOR HANDLING SERVICE REQUESTS IN A DATA PROCESSING SYSTEM

(75) Inventors: Jinmei Shen, Rochester, MN (US); Hao Wang, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 599 days.

(21) Appl. No.: 11/621,665

(22) Filed: Jan. 10, 2007

(65) Prior Publication Data

US 2008/0168446 A1    Jul. 10, 2008

(51) Int. Cl.
G06F 15/16    (2006.01)
G06F 15/173    (2006.01)

(52) U.S. Cl. .................. 709/235; 709/223; 709/226; 709/217; 709/225

(58) Field of Classification Search .................. 709/223, 709/225, 226, 217, 235
See application file for complete search history.

(56) References Cited

U.S. PATENT DOCUMENTS

2006/0059253 A1 *   3/2006   Goodman et al. ............ 709/223

* cited by examiner

*Primary Examiner*—Tonia L Dollinger
*Assistant Examiner*—Anish Sikri
(74) *Attorney, Agent, or Firm*—Dillon & Yudell LLP; Patterson & Sheridan LLP

(57) ABSTRACT

A method for handling service requests in a data processing system is disclosed. In response to a service request, a priority of the service request is determined by mapping a context of the service request to a service level agreement (SLA). SLA-aware and timeout-conscious and preemptive and replayable lock manager is designed to account for different operational goals and different importance to satisfy various SLAs. An average processing time of the service request is then calculated based on statistical results. The service request will be allowed to process if the determined average processing time meets historical guarantee situations.

15 Claims, 3 Drawing Sheets

METHOD AND APPARATUS FOR HANDLING SERVICE REQUESTS IN A DATA PROCESSING SYSTEM

BACKGROUND OF THE INVENTION

1. Technical Field

The present invention relates to data processing systems in general and in particular to a method and apparatus for handling service requests in data processing systems. Still more particularly, the present invention relates to a method and apparatus for handling service requests in a data processing system by enabling clients differentiations while satisfying different service level agreements.

2. Description of Related Art

A clustered server system typically receives millions of requests coming from multiple clients concurrently. Each client may have different operational goals and guarantee service levels based on its service level agreement (SLA). Because requests from one client may also have different levels of importance, each request needs to be handled differently according to the SLA requirements of the corresponding client.

Before requests reach a clustered server system, they are initially handled by routers, such as on-demand routers (ODRs). An ODR classifies requests into service groups having different operational goals and requirements, such as timeout value, response time, importance, thresholds, etc. After classifying incoming requests into several service groups with different operational goals and requirements, the ODR routes the requests accordingly.

With concurrent processing being used in clustered server systems, data lock mechanisms must be utilized to ensure data integrity. However, all prior art lock mechanisms cannot account for classification, cannot enforce response time, and cannot be timeout conscious to rearrange waiting queue. Thus, the above-mentioned ODR approach for meeting different operational goals sometimes does not work because it cannot resolve different data tier and cache tier problems.

Quite often, data tier and cache tier are the biggest limitation for clients to meet their own operational goals. When different classes of users are trying to access the same data, and since data tier is fixed and cannot be shrunk and expanded, the same data can be locked by a low-class request while a high-class request has to wait for a lock to be released by the low-class request.

Since a low-class request may hold a lock such that a high-class request cannot access data in a server, a transactional local or remote cache, a databases, etc., an SLA may be violated due to certain operational requirements not being met. For example, if request1 and request2 are received at about the same time, with request1 being a low-class request (e.g., importance=7, response time=5 minutes, timeout=30 minutes, threshold=90%, SLA=50% 3 minutes) and request2 being a high-class request (e.g., importance=1, response time=2 seconds, timeout=5 seconds, SLA=100% 1.5 seconds); and if request1, which needs 10 seconds to complete, is received 0.05 seconds earlier than request2, then request1 will hold locks in a database server and a server cache, and request2 has to wait for the locks to be released by request1. If timeout occurs before request2 can get the locks, the condition of the SLA for request2 is violated.

Consequently, it would be desirable to provide an improved method and apparatus for handling service requests in a data processing system; especially for concurrent data accesses by different kinds of clients with different SLAs.

SUMMARY OF THE INVENTION

In accordance with a preferred embodiment of the present invention, in response to a service request, a priority of the service request is determined by mapping a context of the service request to a service level agreement (SLA). SLA-aware and timeout-conscious and preemptive and replayable lock manager is designed to account for different operational goals and different importance to satisfy various SLAs. An average processing time of the service request is then calculated based on statistical results. The service request will be allowed to process if the determined average processing time meets historical guarantee situations.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
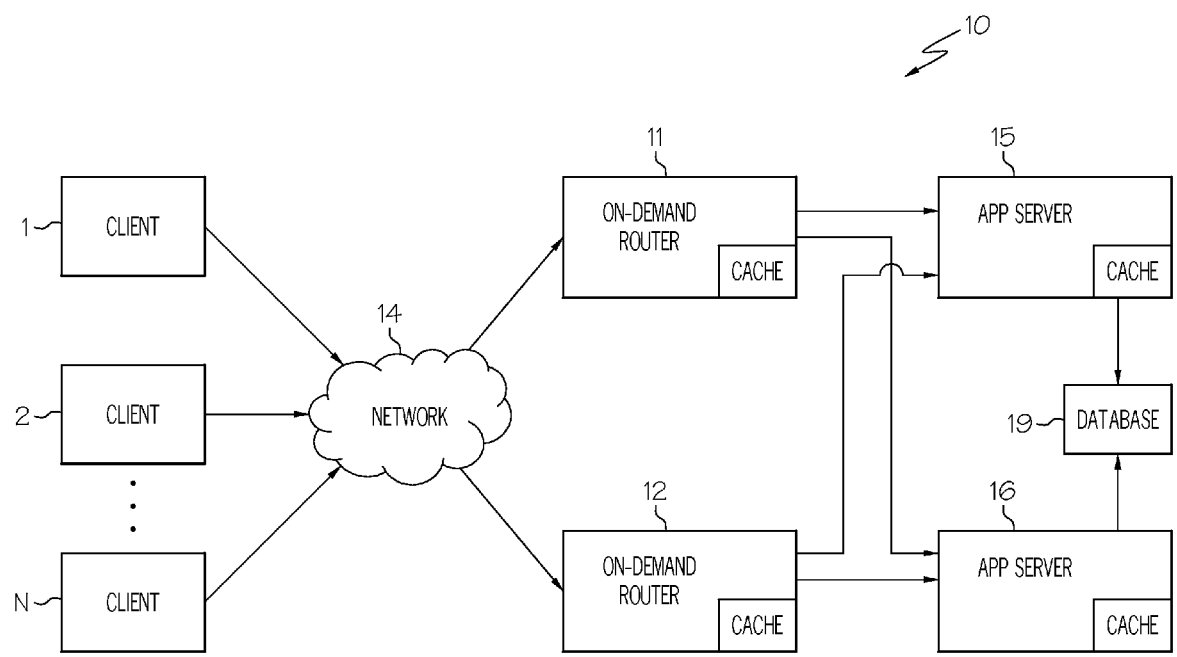
FIG. 1 is a block diagram of a data processing system for supporting transactional services according to service level agreements, in which a preferred embodiment of the present invention is incorporated.

Referring now to the drawings and in particular to FIG. 1, there is depicted a block diagram of a data processing system for supporting transactional services according to service level agreements (SLAs), in which a preferred embodiment of the present invention is incorporated. As shown, a data processing system 10 includes a set of routers, such as on-demand routers 11-12, and a server cluster having application servers 15-16. Client systems, such as client systems 1-N, can invoke services by making service requests to application servers 15-16 via a network 14. Any service request from client systems 1-N is initially handled by on-demand routers 11-12. On-demand routers 11-12 supports a set of SLAs corresponding to various transactional applications, such as stock transactions, running on application servers 15-16. Each individual transaction preferably runs on one of application servers 15-16 that can access a database 19 or local/remote cache memories. Each of on-demand routers 11-12 and each of application servers 15-16 preferably have their own cache memory for supporting transactional data processing. In order to ensure data integrity and data consistency, cache memories and database 19 use locks to control concurrent accesses. Many different service requests from different clients that have different requirements and SLAs are competing for lock to access/modify data.

In accordance with a preferred embodiment of the present invention, a statistical approach is utilized to handle service requests in a data processing system, such as data processing system 10. For example, if high-class requests are guaranteed to receive a response time of 1 second 99% of the time, a current high-class request must be met within 1 second in order not to violate the SLA. According to historical records, processing the type of transaction associated with a high-class request needs an average of 0.5 seconds with a sigma (i.e., the square root of variance) of 0.1, so a 3 sigma time (i.e., 0.1*3+0.5=0.8) is needed in order to guarantee that a high-class request to be finished in the 99% guarantee level. Thus, if a high-class request has already been waiting for 0.1 second, it can wait at most for another 0.1 second.

If a low-class request is received 2 minutes before the receipt of a high-class request, the low-class request will be preempted to yield locks to the high-class request. But if the low-class request has already been waiting for a while, and the low-class request is approaching its timeout value of, for example, 2.5 minutes, and according to the historical records, the average processing average time for a transaction associated with low-class request is 0.3 minute with a sigma of 0.1, then the low-class request is guaranteed to have a response time within 2.4 minutes 60% of the time. Thus, the low-class request can wait for another 0.1 minute at the most, and its transaction needs to be replayed in order to not violate the SLA.

Regarding the importance calculations, historical records guarantee situations for each class of requests need to be considered. For example, when high-class requests should be guaranteed 90% of the time for response time within 10 seconds, and low-class requests should be guaranteed 50% of the time for response time within 2 minutes. Then, within a 24-hour's time or any time period as specified by a system administrator, if high-class requests had already been guaranteed 95% of the time for response time within 10 seconds, but only 50% of the low-class requests were guaranteed for response time within 2 minutes, and if there are one high-class request and one low-class request competing for the same lock, the low-class request should be allowed to go first because if the low-class request failed to respond within 2 minutes, the 50% requirement of the SLA will be violated. Besides, the overall percentage of response time within 10 seconds for high-class requests may drop 94%, but it is still greater than the 90% guarantee level.

The consideration of how many multiple low-class requestors grouped together becomes more important than one single high-class requestor can be calculated as a weighted sum. For example, in the following scenario, there are five classes with class-1 being the lowest and class-5 being the highest, and there are two class-1 requestors, one class-2 requestor, and one class-3 requestor concurrently holding locks on an object. When a class-5 requestor appears and the request from the class-5 requestor needs to be handled soon, the question becomes: whether the four low-class requestors as a group or the one high-class requestor is more important? The customer, such as an administrator, can set a predetermined weight value for such determination. In the above-mentioned scenario, a weight value between 1 and 100 can be assigned to each of the five classes of requestors as follows: class-1=1, class-2=5, class-3=9, class-4=21, class-5=100. Then, the weighted sum for four low-class requestors can be calculated as 2*1+1*5+1*9=16, and the weighted sum for one high-class requestor can be calculated as 1*100=100. Thus, in the present example, a preemptive is performed to allow the service request from the high-class requestor to be handled before the service requests of the other four low-class requestors.

Figure 2A:
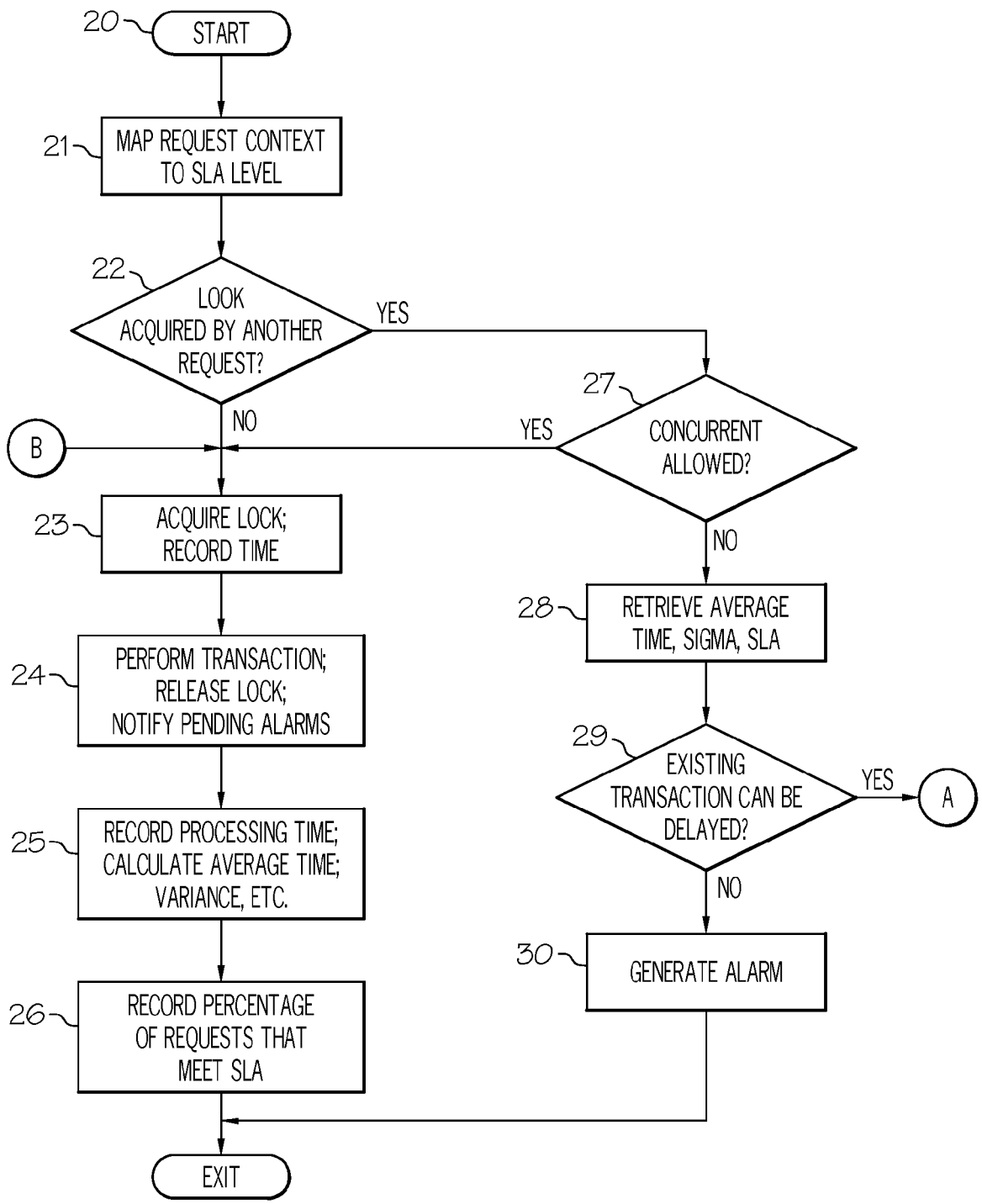
FIGS. 2a-2b are high-level logic flow diagrams of a method for handling service requests in the data processing system of FIG. 1, in accordance with a preferred embodiment of the present invention.
Figure 2B:
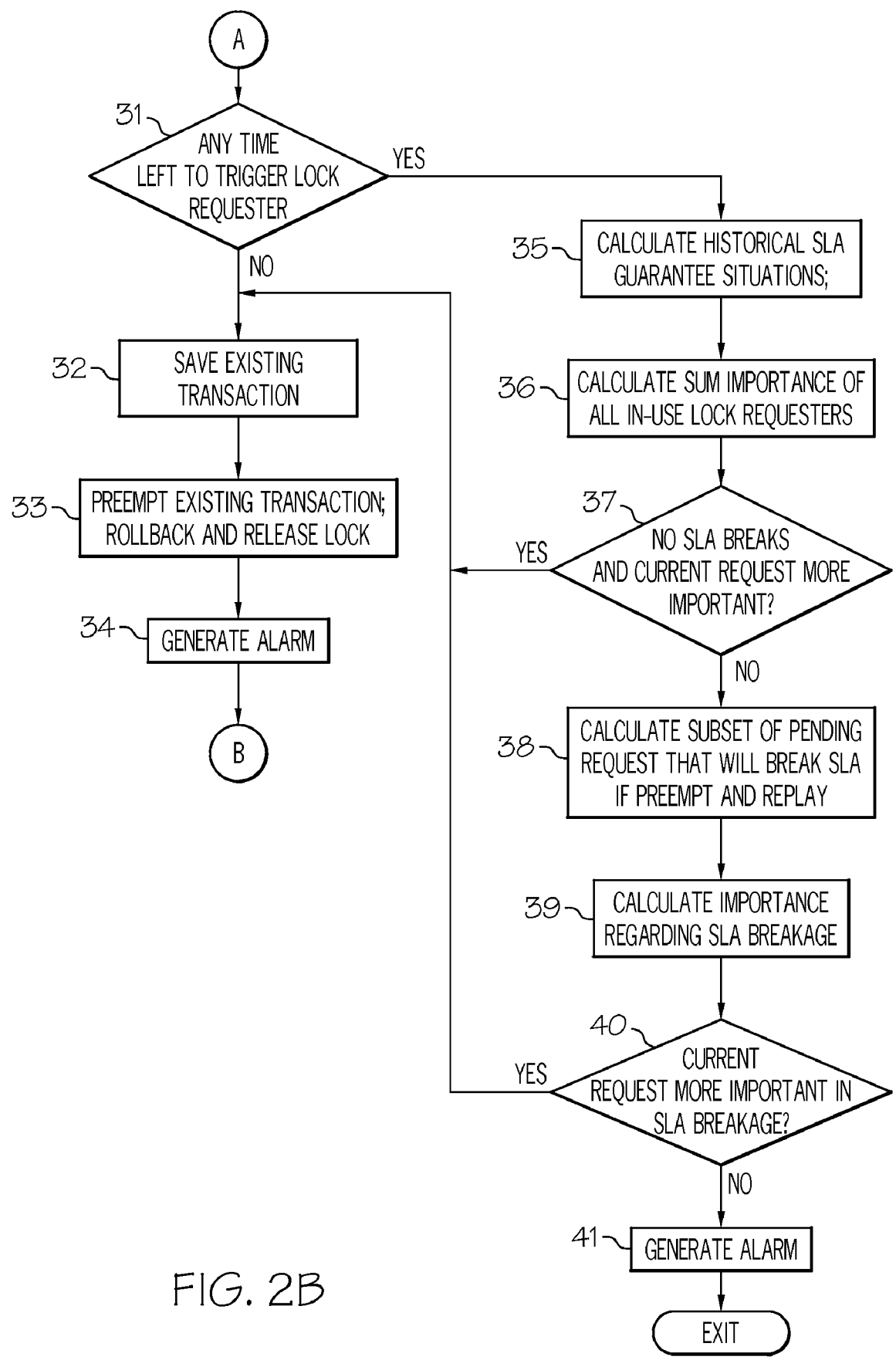

With reference now to FIGS. 2a-2b, there are depicted high-level logic flow diagrams of a method for handling service requests in data processing system 10 from FIG. 1, in accordance with a preferred embodiment of the present invention. Starting at block 20, after the receipt of a request, the context of a request is mapped to an SLA level, as shown in block 21. Preferably, a request interceptor is utilized to extract context, and a user request differentiator is utilized to process the request context. Before acquiring a lock for the request, a determination is made as to whether or not the lock has been acquired by another request, as depicted in block 22. If the lock has not been acquired by another request, the lock is acquired, and the time of lock acquisition is recorded, as shown in block 23. Then, the transaction corresponding to the request is performed, the lock is released afterwards, and pending alarms are notified of the lock has been released, as depicted in block 24. The processing time for the transaction is recorded, and the average time, variance and counts of the transaction are also calculated, as shown in block 25. The transaction is subsequently recorded as a percentage of requests that met the SLA requirements, as depicted in block 26.

Otherwise, if the lock has been acquired by another request(s), a determination is made as to whether or not concurrent processing is allowed based on the lock type and isolation level, as shown in block 27. If concurrent processing is allowed, the process proceeds to block 23. However, if concurrent processing is not allowed, then the average processing time, sigma and the SLAs for both requests are retrieved, as depicted in block 28.

A determination is then made as to whether or not the existing transaction from another request can be delayed without violating its SLA before timeout and the required response time, as shown in block 29. Such determination is made by calculating $$\text{timeout}-\text{elapsed time}-(\text{average processing time}+n^*\text{sigma}); \quad [\text{condition 1}]$$

$$\text{response time}-\text{elapsed time}-(\text{average processing time}+n^*\text{sigma}) \quad [\text{condition 2}]$$

where (response time−elapsed time) is the remaining time for completing the transaction, sigma and average processing time are statistical deviations and mean of the historical processing time of this type of transactions, respectively, and n is the number of sigma.

The remaining time is the lesser of (timeout−leased time) and (response time−elapsed time), where response time is the required target response time under the SLA. For example, if the existing client request requires 60 seconds, the request times out is 90 seconds, and it has been 10 seconds (elapse time) since the request arrives, then the remaining time is 60−10=50 seconds for target response time, and the remaining time is 90−10=80 seconds for timeout (before request times out). The request needs an average of 30 seconds to process with a standard deviation of 5 seconds. If the guarantee level is 99%, then 30+5*3=45 seconds are needed to guarantee that the request is processed within 99%, 60−10−(30−5*3)=5 seconds for target response time; 90−10−(30−5*3)=35 seconds for timeout; that means the process has 5 seconds more than processing time for target response time, 35 seconds more than processing time for timeout. The smaller one (i.e., 5 seconds) is chosen, which means the processing of the existing request can be delayed by 5 seconds while still meeting both target response time and timeout requirement. Therefore, an alarm is set as 5 seconds to go off at the latest (it can be waken earlier if the lock is released by other requests).

If the timeout is 58 instead of 90; then the process has 3 seconds more than processing time before it times out; so the existing request can be delayed at most 3 seconds before it times out. An alarm is then set at 3 seconds instead of 5 seconds.

If the lesser value of [condition 1] and [condition 2] is a negative number (i.e., the existing transaction from another request cannot be delayed), then an alarm having a set-off time of (remaining time−average processing time+n*sigma) is generated, as depicted in block 30. The request queued with this alarm can be handled earlier when the pending alarms were notified of the available lock in block 24.

Otherwise, if the lesser value of [condition 1] and [condition 2] is a positive number (i.e., the existing transaction from another request can be delayed), then a determination is made as to whether or not there is any time left to trigger a lock requestor, as shown in block 31. If there is no time left to trigger a lock requestor, then the existing transaction is saved, as depicted in block 32. The existing transaction is rollback and the lock is released, as shown in block 33. After an alarm having a set-off time of [remaining time−(average processing time+n*sigma)] has been generated, as depicted in block 34, the process then proceeds to block 23.

However, if there is still time left to trigger a lock requestor, then the historical SLA guarantee is calculated, and a check is performed to determine if there is any room to fail the current request but still meet the SLA guarantee, as shown in block 35. The weighted sum of all current lock holders is calculated, as depicted in block 36. A determination is made as to whether or not there is any SLA violation if the existing transaction is preempted to be replayed later, and whether or not the current request is more important, as shown in block 37. If there is no SLA violation if the existing transaction is preempted to be replayed later, and the current request is more important, then the process proceeds to block 32.

Otherwise, if there is an SLA violation if the existing transaction is preempted to be replayed later, and the current request is more important, then the subset of the current request that will violate the SLA if preempted is calculated, as depicted in block 38. The importance of the SLA violation for the current request is calculated, as shown in block 39.

A determination is made as to whether or not the current request is more important than the SLA violation, as depicted in block 40. It is the situation when the process has to allow some transactions to break their SLA since the existing transaction cannot be preempted to be replayed within its "safe" response time or timeout values (i.e., there is not enough time left for it to be replayed), so current transaction cannot acquire lock. As such, a determination needs to be made as to which transaction is more important according to the historical records of satisfactory statistics of all the transactions. For example, if one transaction type is guaranteed to satisfy 50% times within 2 minutes, historically only 50% were met, and if this transaction cannot be completed on time, then the overall SLA will be violated. Other transaction type is to satisfy 90% times within 10 seconds, historically, only 95% of the transactions are satisfied within 10 seconds, and if this transaction can be completed more than 10 seconds, the overall SLA for this type of transaction can still meet 90% within 10 seconds requirement, so this transaction can be violated.

If the current request is more important than the SLA violation, then the process proceeds to block 32. If the current request is not more important than the SLA violation, then an alarm for the current request is generated, and the existing transaction is allowed to be completed, as shown in block 41.

There are two cases that alarms are being utilized. In the first case, a pending alarm is notified after a transaction has been completed and a lock has been released, as depicted in block 24 of FIG. 2a. After a pending alarm has been notified, the alarm manager locates for the most important request the type of lock that is being waited by the most important request. The alarm manager then cancels the alarm for the most important request, and the process then proceeds to block 31 in FIG. 2b. In the second case, when a pending alarm has not been notified, the pending alarm will be set off according to a scheduled time so a request is competing again with other requests for a lock, and the process then proceeds to block 31 in FIG. 2b.

As an example, after a pending alarm has been set to go off 5 minutes later, the alarm can be canceled in order to handle a request if a lock can be obtained within 5 minutes. However, if the alarm manager does not get a notice within 5 minutes regarding the acquiring of a free lock, the alarm will go off after exactly 5 minutes, and the request is going to the handling stream again to compete for a lock against other requests from entry point <A> at block 31 of FIG. 2b.

As has been described, the present invention provides an improved method and apparatus for handling service requests in a data processing system. The present invention provides dynamic and preemptive locking mechanism that takes classification, response-time, and timeout into account. The present invention allows on-demand performance in all components within enterprise database systems, enterprise cache systems, as well as enterprise transactional processing systems, and not just at on-demand routers.

It is also important to note that although the present invention has been described in the context of a database system, those skilled in the art will appreciate that the mechanisms of the present invention are capable of being distributed as a program product in a variety of forms, and that the present invention applies equally regardless of the particular type of signal bearing media utilized to actually carry out the distribution.

Examples of non-transitory computer readable media/medium include, without limitation, recordable type media such as floppy disks or compact discs.

While the invention has been particularly shown and described with reference to a preferred embodiment, it will be understood by those skilled in the art that various changes in form and detail may be made therein without departing from the spirit and scope of the invention.

What is claimed is:

1. A method for handling service requests in a data processing system, said method comprising:
   in response to a service request, determining a priority of said service request by mapping a context of said service request to a service level agreement (SLA);
   in response to a lock being acquired by another service request and concurrent processing of said service request and said another service request is not allowed, determining, by use of one or more computer processors, whether or not an existing transaction associated with said another service request can be delayed based on average processing time of said service request and said another service request;
   in a determination that said another service request cannot be delayed, generating an alarm and continue processing said existing transaction; and
   in a determination that said another service request can be delayed, preempting said existing transaction, generating an alarm and processing a transaction associated with said service request.

2. The method of claim 1, wherein said determining whether or not an existing transaction associated with said another service request can be delayed is performed by calculating $$\text{timeout}-\text{elapsed time}-(\text{average processing time}+n^*\text{sigma});\quad\text{[condition 1]}$$

$$\text{response time}-\text{elapsed time}-(\text{average processing time}+n^*\text{sigma})\quad\text{[condition 2]}$$

where (response time−elapsed time) is the remaining time for completing said existing transaction, sigma and average processing time are statistical deviations and mean of the historical processing time of said existing transaction, respectively, and n is the number of sigma.

3. The method of claim 2, wherein said existing transaction associated with said another service request can be delayed if the lesser value of [condition 1] and [condition 2] is a positive number.

4. The method of claim 3, wherein said existing transaction associated with said another service request cannot be delayed if the lesser value of [condition 1] and [condition 2] is a negative number.

5. The method of claim 1, wherein said generating an alarm further includes generating an alarm having a set-off time of [remaining time−(average processing time+n*sigma)].

6. A non-transitory computer readable medium having a computer program product for handling service requests in a data processing system, said computer usable medium comprising:
   program code means for, in response to a service request, determining a priority of said service request by mapping a context of said service request to a service level agreement (SLA);
   program code means for, in response to a lock being acquired by another service request and concurrent processing of said service request and said another service request is not allowed, determining whether or not an existing transaction associated with said another service request can be delayed based on average processing time of said service request and said another service request;
   program code means for, in a determination that said another service request cannot be delayed, generating an alarm and continue processing said existing transaction; and
   program code means for, in a determination that said another service request can be delayed, preempting said existing transaction, generating an alarm and processing a transaction associated with said service request.

7. A non-transitory computer readable medium of claim 6, wherein said program code means for determining whether or not an existing transaction associated with said another service request can be delayed is performed by calculating $$\text{timeout} - \text{elapsed time} - (\text{average processing time} + n*\text{sigma}); \quad [\text{condition 1}]$$

$$\text{response time} - \text{elapsed time} - (\text{average processing time} + n*\text{sigma}) \quad [\text{condition 2}]$$

where (response time−elapsed time) is the remaining time for completing said existing transaction, sigma and average processing time are statistical deviations and mean of the historical processing time of said existing transaction, respectively, and n is the number of sigma.

8. A non-transitory computer readable medium of claim 7, wherein said existing transaction associated with said another service request can be delayed if the lesser value of [condition 1] and [condition 2] is a positive number.

9. A non-transitory computer readable medium of claim 8, wherein said existing transaction associated with said another service request cannot be delayed if the lesser value of [condition 1] and [condition 2] is a negative number.

10. A non-transitory computer readable medium of claim 9, wherein said program code means for generating an alarm further includes program code means for generating an alarm having a set-off time of [remaining time−(average processing time+n*sigma)].

11. A data processing system for handling service requests, said data processing system comprising:
    means for, in response to a service request, determining a priority of said service request by mapping a context of said service request to a service level agreement (SLA);
    means for, in response to a lock being acquired by another service request and concurrent processing of said service request and said another service request is not allowed, determining whether or not an existing transaction associated with said another service request can be delayed based on average processing time of said service request and said another service request;
    means for, in a determination that said another service request cannot be delayed, generating an alarm and continue processing said existing transaction; and
    means for, in a determination that said another service request can be delayed, preempting said existing transaction, generating an alarm and processing a transaction associated with said service request.

12. The data processing system of claim 11, wherein said means for determining whether or not an existing transaction associated with said another service request can be delayed is performed by calculating $$\text{timeout} - \text{elapsed time} - (\text{average processing time} + n*\text{sigma}); \quad [\text{condition 1}]$$

$$\text{response time} - \text{elapsed time} - (\text{average processing time} + n*\text{sigma}) \quad [\text{condition 2}]$$

where (response time−elapsed time) is the remaining time for completing said existing transaction, sigma and average processing time are statistical deviations and mean of the historical processing time of said existing transaction, respectively, and n is the number of sigma.

13. The data processing system of claim 12, wherein said existing transaction associated with said another service request can be delayed if the lesser value of [condition 1] and [condition 2] is a positive number.

14. The data processing system of claim 13, wherein said existing transaction associated with said another service request cannot be delayed if the lesser value of [condition 1] and [condition 2] is a negative number.

15. The data processing system of claim 11, wherein said means for generating an alarm further includes means for generating an alarm having a set-off time of [remaining time−(average processing time+n*sigma)].

* * * * *